(12) United States Patent
Farniok et al.

(10) Patent No.: US 12,390,865 B2
(45) Date of Patent: Aug. 19, 2025

(54) TOOL ALIGNMENT SYSTEM AND METHOD

(71) Applicant: THE BOEING COMPANY, Chicago, IL (US)

(72) Inventors: Craig Martin Farniok, Godfrey, IL (US); Todd Jeremy Roffo, San Antonio, TX (US); Thomas A. Brown, Moncks, SC (US)

(73) Assignee: The Boeing Company, Chicago, IL (US)

( * ) Notice: Subject to any disclaimer, the term of this patent is extended or adjusted under 35 U.S.C. 154(b) by 629 days.

(21) Appl. No.: 17/650,091

(22) Filed: Feb. 7, 2022

(65) Prior Publication Data

US 2023/0249265 A1    Aug. 10, 2023

(51) Int. Cl.
 *B23B 49/02*    (2006.01)
 *B23B 47/28*    (2006.01)

(52) U.S. Cl.
 CPC ............ *B23B 49/023* (2013.01); *B23B 47/28* (2013.01); *B23B 2215/04* (2013.01); *B23B 2247/10* (2013.01); *B23B 2260/026* (2013.01); *Y10T 408/03* (2015.01); *Y10T 408/568* (2015.01); *Y10T 408/569* (2015.01)

(58) Field of Classification Search
 CPC ............ B23B 2247/08; B23B 2247/10; B23B 2247/00; B23B 2260/026; B23B 2260/104; B23B 2260/004; B23B 2270/58; B23B 2215/04; B23B 49/023; B23B 49/02; B23B 49/00; B23B 47/28; B23B 51/0054; B23B 11/00; B23B 39/025; B23B 47/287; B23Q 39/025; Y10T 408/567; Y10T 408/568; Y10T 408/569

USPC ................................ 408/115 R, 115 B, 72 B
See application file for complete search history.

(56) References Cited

U.S. PATENT DOCUMENTS

| 2,209,433 | A | * | 7/1940 | Ulrich | ...................... B23B 47/28 |
| | | | | | 408/72 R |
| 2,265,616 | A | * | 12/1941 | Ulrich | ....................... F16J 1/06 |
| | | | | | 92/236 |
| 2,548,197 | A | * | 4/1951 | Conner | .................. B23B 47/287 |
| | | | | | 33/562 |

(Continued)

FOREIGN PATENT DOCUMENTS

| CN | 106825688 A | * | 6/2017 | ........... B23B 47/287 |
| DE | 4227975 A1 | * | 3/1993 | ........... B23B 47/287 |

(Continued)

*Primary Examiner* — Sunil K Singh
*Assistant Examiner* — Michael Vitale
(74) *Attorney, Agent, or Firm* — Jospeh M. Butscher; The small Patent LAw Group LLC (57) ABSTRACT

A system and a method include a fixture template configured to be secured to a component. The fixture template includes a plurality of insert holes. A plurality of guide inserts have channels. Each of the channels has an orientation. The orientation of at least two of the plurality of guide inserts differs. Each of the plurality of guide inserts is removably secured within a respective one of the plurality of inserts holes to position and orient the channels in relation to a pattern of openings to be formed in relation to the component. Each of the channels is configured to receive an operative member of a tool that is configured to form the pattern of openings in relation to the component.

20 Claims, 4 Drawing Sheets

(56) References Cited

U.S. PATENT DOCUMENTS

| | | | | | |
|---|---|---|---|---|---|
| 4,586,846 | A | * | 5/1986 | Kellison | B28D 1/14 404/6 |
| 4,793,747 | A | * | 12/1988 | Reitz | B23B 47/28 408/72 R |
| 4,922,573 | A | * | 5/1990 | Miller | F16B 37/122 156/92 |
| 5,056,965 | A | * | 10/1991 | Tsui | B23B 49/023 408/241 B |
| 5,318,394 | A | * | 6/1994 | Pierce | B23B 47/287 408/241 B |
| 5,947,656 | A | * | 9/1999 | Simson | B23B 47/28 408/241 B |
| 7,073,991 | B2 | * | 7/2006 | Thomas | B23B 47/287 408/103 |
| 7,112,014 | B2 | * | 9/2006 | Thomas | E05B 17/06 408/1 R |
| 9,108,250 | B1 | * | 8/2015 | Bui | B23B 47/28 |
| 10,183,340 | B2 | * | 1/2019 | Lentz | B23B 49/023 |
| 2003/0157457 | A1 | * | 8/2003 | Blacklock | A61B 17/176 433/76 |
| 2016/0199922 | A1 | * | 7/2016 | Andersson | G05B 19/4015 700/160 |
| 2023/0405690 | A1 | * | 12/2023 | Nelson | F16B 15/00 |

FOREIGN PATENT DOCUMENTS

| | | | | | |
|---|---|---|---|---|---|
| GB | 2063730 | A | * | 6/1981 | B23B 49/02 |
| GB | 2346573 | A | * | 8/2000 | B23B 47/28 |
| JP | 2001059297 | A | * | 3/2001 | B23B 47/287 |
| JP | 2001259912 | A | * | 9/2001 | B23B 49/02 |
| WO | WO-2004076106 | A1 | * | 9/2004 | A61C 1/084 |

* cited by examiner

TOOL ALIGNMENT SYSTEM AND METHOD

FIELD OF THE DISCLOSURE

Examples of the present disclosure generally relate to tool alignment systems and methods, such as are used to align an operative portion of a tool in relation to a component that is configured to be modified by the tool.

BACKGROUND OF THE DISCLOSURE

Various components are operated on by tools. For example, a tool can be used to drill holes into a component, such as a panel, sheet, block, or the like. As another example, a saw can be used to cut portions of components. A tool includes an operative member, such as a drill bit, blade, laser emitter, and/or the like.

Various systems include components that may be replaced. For example, portions of a fuselage of an aircraft can be replaced. As a further example, a first outer skin portion of an aircraft can be replaced with a second outer skin portion. A tool, such as a drill, can be used to form holes in the skin portions that receive fasteners, such as bolts, which secure the skin portions to another portion of the fuselage. When the first outer skin portion is removed, a hole pattern of the second outer skin portion typically needs to match that of the replaced portion, and/or is configured to secure in a different pattern. In either case, however, the hole pattern is precisely positioned and oriented in order to securely and properly couple the replacement portion to another portion to which the replacement portion secures.

Currently, a variety of non-efficient methods are utilized to transfer hole locations from an initial part to a replacement part. As an example, when a skin on an aircraft is replaced, it can be difficult to transfer the locations of the openings on the old skin to the new skin due to accessibility.

In general, manually laying out a pattern of holes for drilling is labor and time intensive, and typically relies upon highly skilled craftsmen for measurement, layout, and drilling.

SUMMARY OF THE DISCLOSURE

A need exists for a system and a method for efficiently and effectively forming a pattern of holes in a component. Further, a need exists for a system and a method for efficiently and effectively replacing portions of a component, such as skin portions of a fuselage of an aircraft.

With those needs in mind, certain examples of the present disclosure provide a system including a fixture template configured to be secured to a component. The fixture template includes a plurality of insert holes. A plurality of guide inserts has guiding features, such as channels. Each of the channels has an orientation. The orientation of at least two of the plurality of guide inserts differs. Each of the plurality of guide inserts is removably secured within a respective one of the plurality of inserts holes to position and orient the channels in relation to a pattern of openings to be formed in relation to the component. Each of the channels is configured to receive an operative member of a tool that is configured to form the pattern of openings in relation to the component.

In at least one example, the tool is a drill. In at least one example, the component is a portion of an aircraft.

In at least one example, the fixture template further includes index slots connected to the plurality of insert holes (for example, slotted apertures that extend from the holes). The plurality of guide inserts include keys that are configured to be removably secured within the index slots.

In at least one example, the orientation of each of and all of the plurality of guide inserts differs.

In at least one example, each of the plurality of guide inserts includes a plug and a collar. The channels are formed through the plug and collar. The plug is configured to be received and retained by one of the plurality of insert holes.

In at least one example, outer dimensions of the plug and the collar for each of the plurality of guide inserts are common.

The orientation includes a length, an axial angle, and a radial angle. In at least one example, the orientation of at least two of the plurality of guide inserts differs with respect to one or more of the length, the axial angle, or the radial angle.

In at least one example, the fixture template further includes a different fixture identifier proximate to each of the plurality of insert holes. Each of the plurality of guide inserts includes a different insert identifier. Each of the different insert identifiers corresponds to one of the different fixture identifiers to ensure proper location of the plurality of guide inserts within the plurality of insert holes.

Certain examples of the present disclosure provide a method including securing a fixture template to a component, the fixture template including a plurality of insert holes; removably securing each of a plurality of guide inserts within a respective one of the plurality of inserts holes to position and orient channels of the plurality of guide inserts in relation to a pattern of openings to be formed in relation to the component, wherein each of the channels has an orientation, wherein the orientation of at least two of the plurality of guide inserts differs; and receiving, by each of the channels, an operative member of a tool that is configured to form the pattern of openings in relation to the component.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide adaptable drill fixture devices that include modular and removable drill guide bushings with indexing features for positive location within receiving holes contained in a drill fixture or template. Replication of existing hole patterns can be achieved by incorporating each unique hole location and orientation from actual, measured holes within the modular drill guide bushing and relying upon placement of each individual hole by known locations of receiving holes in the drill fixture. Three dimensional measurement data of holes is utilized to fabricate unique bushings (which could be three-dimensionally printed) for each hole, which serve as guides for drilling holes to replicate hole patterns. Examples of the present disclosure provide accurately replicated hole patterns for mating parts, and reduce occurrence of oversized holes for replicated hole patterns.

In at least one example, the system and method provide an adaptable drill fixture device and drill guides which can be utilized within a standardized drill fixture for replication of hole patterns in which hole location and orientation variation is anticipated. Examples of the present disclosure ensure that accurate hole locations are drilled for mating hole patterns.

Certain examples of the present disclosure provide a system that includes a fixture template and a plurality of guide inserts or bushings to be installed in the fixture template. Each guide insert has an opening extending therethrough that has a position and orientation. The position and orientation of the guide insert opening corresponds to a position and orientation of an opening extending through a receiving structure. Each guide insert is configured to be installed in a particular location and orientation within the fixture template. In at least one example, each guide bushing includes an identifier, such as a label, which enables an operator to install the guide bushing in the correct location within the fixture template. Additionally, each guide bushing includes a key or keying feature, such as an indexing pin, that mates with an index slot formed within the opening in the fixture template. In this manner, the guide bushing is properly oriented within the opening, which ensures that the location and orientation of the opening extending thru the guide bushing matches the location and orientation of the opening extending thru the receiving structure.

Figure 1:
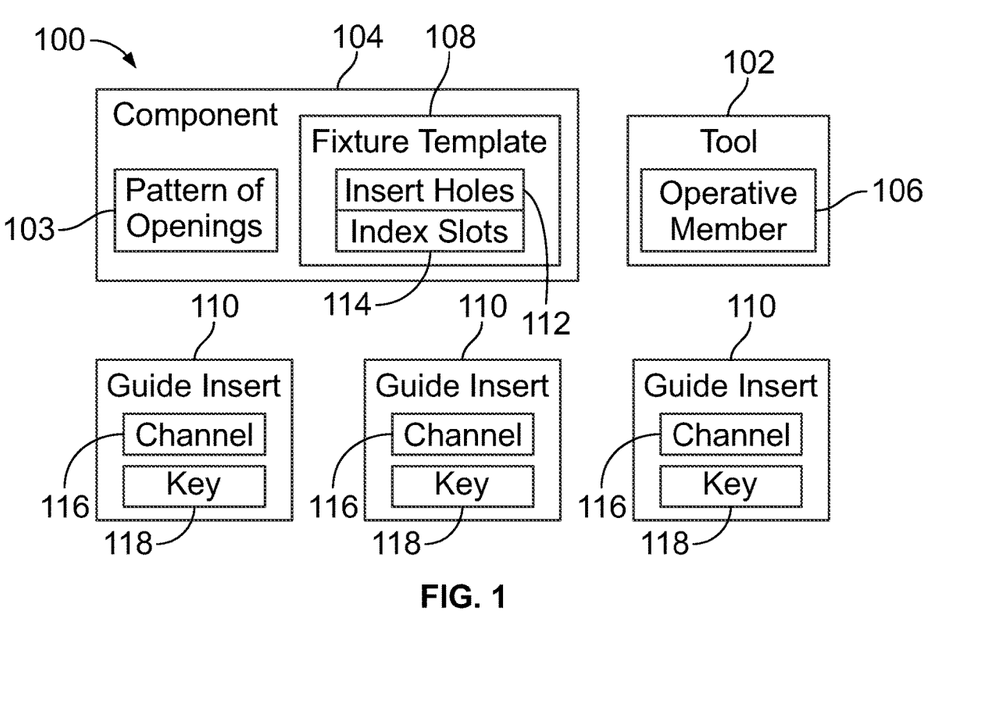
FIG. 1 illustrates a schematic block diagram of a system for aligning a tool in relation to a component, according to an example of the present disclosure.

FIG. 1 illustrates a schematic block diagram of a system 100 for aligning a tool 102 in relation to a component 104, according to an example of the present disclosure. The tool 102 is configured to operate on the component 104. The tool 102 can be a drill, for example. As such, the tool 102 has an operative member 106, such as a drill bit, that is configured to form holes on, in, and/or through the component 104. As another example, the tool 102 can be a saw. In this example, the operative member 106 can be a blade, for example, which is configured to cut the component 104, and/or form incisions on, in, and/or through the component 104. As another example, the tool 102 can be a laser cutting tool. As another example, the tool 102 can be a fastener driving tool, such as a screw driver.

The component 104 can be any type of structure that is to be operated on by the tool 102. For example, the component 104 can be a panel, sheet, block, and/or the like. In at least one example, the component 104 is a portion of a fuselage of an aircraft, such as an outer skin portion. In at least one example, the component 104 is a replacement skin that is to be secured to another portion of an aircraft, such as to a frame, stringer, and/or the like. The tool 102 is configured to form a pattern of openings 103 in relation to (such as on, in, and/or through) the component 104. In at least one example, the pattern of openings 103 are configured to receive fasteners, such as bolts or screws that are configured to secure the component 104 to another structure.

The system 100 includes a fixture template 108 and a plurality of guide inserts 110 that are configured to align the operative member 106 of the tool 102 to efficiently, effectively, and accurately form the pattern of openings 103 in relation to the component 104. The fixture template 108 includes a plurality of insert holes 112 and index slots 114. The insert holes 112 correspond to a number of the guide inserts 110. For example, if a pattern of openings 103 include five openings, the fixture template 108 includes five insert holes 112 that are configured to receive and retain five respective guide inserts 110. The shape of the fixture template 108, the number of insert holes 112, the number of guide inserts 110 depends on a desired pattern of openings 103 to be formed. The number of insert holes 112 and guide inserts 110 can be any number, depending on the desired pattern of openings 103 to be formed in relation to the component 104. The system 100 can include two or more insert holes 112 and two or more guide inserts 110. For example, the system 100 can include five, six, seven, or more insert holes 112 and respective guide inserts 110.

Each guide insert 110 includes a guiding feature, such as a channel 116, and a key 118. The channel 116 is configured to receive the operative member 106 of the tool 102. The key 118 is configured to be removably secured within, such as received and retained by, a respective index slot 114 of the fixture template 108. For example, the key 118 can be a protuberance, such as a fin, tab, pin, or the like extending from an outer surface of the guide insert 110. The key 118 is configured to fit into a respective index slot 114 of the fixture template 108 to secure the guide insert 110 in the fixture template 108 at a particular position, so that the channel 116 is at a desired orientation.

In operation, the fixture template 108 is secured to the component 104 at a desired position to align the operative member 106 of the tool 102 to form the pattern of openings 103, which is predetermined. For example, the fixture template 108 can be clamped to the component 104. As another example, the fixture template 108 can be secured to the component 104 through adhesives, fasteners, and/or the like. The fixture template 108 is configured to receive and retain the guide inserts 110 within respective insert holes 112.

In at least one example, the channels 116 of the guide inserts 110 are at different orientations. Each guide insert 110 is inserted into a respective insert hole 112 of the fixture template at a particular position in relation to the component 104. The orientations of at least two of the channels 116 of the guide inserts 110 that are inserted into the fixture template 108 differ from one another. In at least one example, when the guide inserts 110 are inserted into the insert holes 112 of the fixture template 108 at respective positions (which differ from another), the orientations of all of the channels 116 differ from one another.

After the guide inserts 110 are disposed within the insert holes 112, the tool 102 can be used in conjunction with the fixture template 108 and the guide inserts 110 to form the pattern of openings 103. For example, the channels 116 are sized and shaped to receive and constrain the operative member 106 of the tool 102. As an example, the diameter of each channel 116 can be sized and shaped to receive the operative member 106, such as a drill bit, to ensure that the operative member is axially constrained and allowed to operatively rotate to form an opening in the component 104. The fixture template 108 secures the guide inserts 110 at desired positions, and the guide inserts 110 have the channels 116 at desired orientations to ensure that the tool 102 forms the pattern of openings 103 in relation to the component 104, as desired.

As described herein, the system 100 includes the fixture template 108 configured to be secured to the component 104. The fixture template 108 includes the plurality of insert holes 112. The plurality of guide inserts 110 have channels 116. Each of the channels 116 has an orientation. The orientation of at least two of the plurality of guide inserts 110 differs. Each of the plurality of guide inserts 110 is removably secured within a respective one of the plurality of insert holes 112 to position (at different locations of the fixture template 108) and orient the channels 116 in relation to the pattern of openings 103 to be formed in relation to the component 104. Each of the channels 116 is configured to receive the operative member 106 of the tool 102 that is configured to form the pattern of openings 103 in relation to the component 104.

Figure 2:
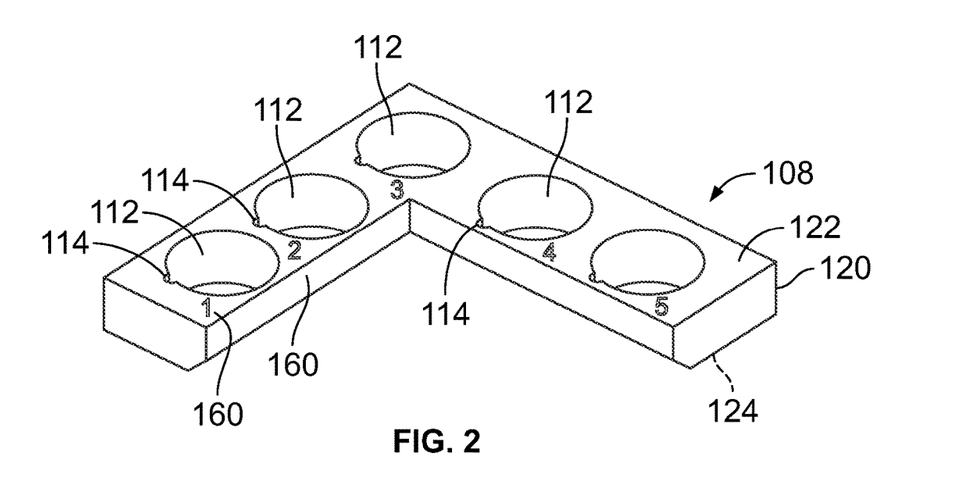
FIG. 2 illustrates an isometric top view of a fixture template, according to an example of the present disclosure.

FIG. 2 illustrates an isometric top view of a fixture template 108, according to an example of the present disclosure. The fixture template 108 includes a main body 120, such as a frame. The main body 120 includes a first surface 122, such as a top surface, opposite from a second surface 124, such as a bottom surface. The second surface 124 is configured to abut against a surface of the component 104 (shown in FIG. 1). The insert holes 112 are formed through the main body 120, such as between and through the first surface 122 and the second surface 124. Index slots 114 connect to (for example, extend from) the insert holes 112. That is, an index slot 114 connects to each insert hole 112.

The fixture template 108 can be sized and shaped differently than shown. Further, the fixture template 108 can include more or less insert holes 112 and index slots 114 than shown.

Figure 3:
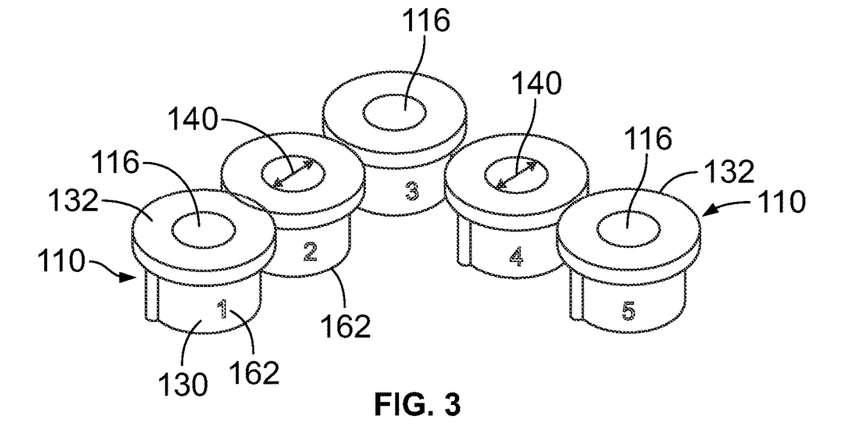
FIG. 3 illustrates an isometric top view of guide inserts, according to an example of the present disclosure.

FIG. 3 illustrates an isometric top view of guide inserts 110, according to an example of the present disclosure. In at least one example, the guide inserts 110 are bushings that are configured to be received and retained within the insert holes 112 of the fixture template (shown in FIGS. 1 and 2).

Each guide insert 110 includes a plug 130 connected to a collar 132. Outer portions of the plugs 130 and the collars 132 can be the same for each of the guide inserts 110. That is, each of the guide inserts 110 can have common (for example, the same) outer dimensions for the plugs 130 and the collars 132.

Referring to FIGS. 1-3, the plugs 130 are sized and shaped to fit within the insert holes 112 of the fixture template 108. In particular, the plugs 130 have an outer perimeter that is slightly smaller than an outer perimeter of the insert holes 112, so that the plugs 130 can be received and retained within the insert holes 112. The collars 132 have larger perimeters than the plugs 130 and the insert holes 112, thereby ensuring that the guide inserts 110 do not fall through the insert holes 112. As shown, the plugs 130 and the collars 132 can have circular axial cross-sections. Optionally, the plugs 130 and the collars 132 can have different axial cross-sections, which correspond to the axial cross-sections of the insert holes 112.

Each guide insert 110 further includes a key 118 outwardly extending from an outer surface of a plug 130 and/or a collar 132. For example, the key 118 can be a fin, pin, tab, or the like. The key 118 is sized and shaped to fit into a respective index slot 114 of the fixture template 108. The key 118 ensures that the guide insert 110 is properly positioned and oriented within the fixture template. Further, the key 118 retained within the index slot 114 ensures that the guide insert 110 is axially and rotationally constrained, thereby ensuring that the guide insert 110 remains properly positioned and oriented when the operative member 106 is disposed within the channel 116.

The channel 116 for each guide insert 110 extends therethrough, such as between and through the collar 132 and the plug 130. In at least one example, the channel 116 is oriented differently for at least two of the guide inserts 110. In at least one example, the channel 116 for each of the guide inserts 110 is at a different orientation.

In at least one example, a diameter 140 of each channel 116 is the same. For example, the diameter 140 is sized and shaped to receive and axially constrain the operative member 106 of the tool 102 (shown in FIG. 1). Each of the channels 116 has an orientation within the guide inserts 110. The orientation includes a length and at least one angle. The orientation for the channels 116 of the guide inserts 110 can differ in relation to one or both of the length and/or the angle.

Figure 4:
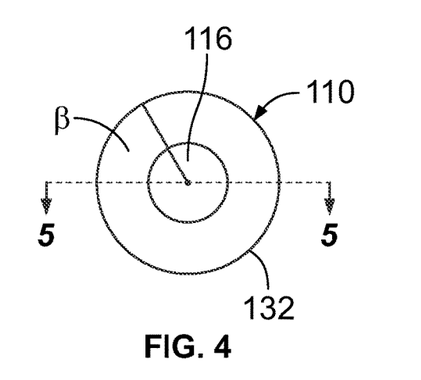
FIG. 4 illustrates a top view of a guide insert, according to an example of the present disclosure.

FIG. 4 illustrates a top view of a guide insert 110, according to an example of the present disclosure. The channel 116 extends through the guide insert 110. The channel 116 is sized and shaped to receive and axially constrain the operative member 106 of the tool 102. For example, the channel 116 is sized and shaped to receive and axially constrain a drill bit of a drilling tool.

Figure 5A:
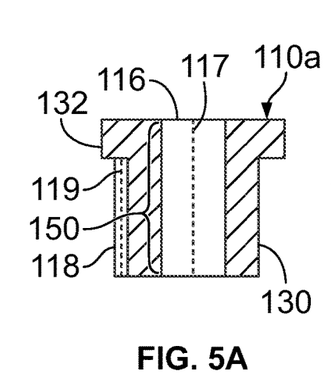
FIG. 5A illustrates an axial cross section of a guide insert through line 5-5 of FIG. 4, according to an example of the present disclosure.

FIG. 5A illustrates an axial cross section of a guide insert 110a through line 5-5 of FIG. 4, according to an example of the present disclosure. As shown, the channel 116 of the guide insert 110a can be coaxial with the plug 130 and the collar 132. The channel 116 has a first length 150. The channel 116 has an axis 117 having a first axial angle in relation to the key 118. For example, the axis 117 is parallel with a longitudinal axis 119 of the key 118. Referring to FIGS. 4 and 5A, the axis 117 also has a first radial angle $\beta$ in relation to the key 118. The first radial angle $\beta$ can be zero degrees, for example. Optionally, the first radial angle $\beta$ can be greater than zero degrees. The first radial angle $\beta$ can be range from zero and three hundred and sixty degrees.

Figure 5B:
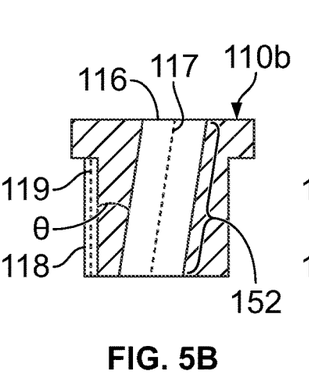
FIG. 5B illustrates an axial cross section of a guide insert through line 5-5 of FIG. 4, according to an example of the present disclosure.

FIG. 5B illustrates an axial cross section of a guide insert 110b through line 5-5 of FIG. 4, according to an example of the present disclosure. As shown, the channel 116 of the guide insert 110b is not coaxial with the plug 130 and the collar 132. The channel 116 has a second length 152, which is longer than the first length 150 shown in FIG. 5A. The channel 116 has an axis 117 having a second axial angle $\theta$ in relation to the key 118. For example, the axis 117 is at the angle $\theta$ in relation to the longitudinal axis 119 of the key 118. The second axial angle $\theta$ differs from the first axial angle of FIG. 5A. Referring to FIGS. 4 and 5B, the axis 117 also has a second radial angle in relation to the key 118. The second radial angle $\theta$ can differ from the first radial angle $\beta$ of the guide insert 110a. Optionally, the first radial angle $\beta$ and the second radial angle $\beta$ can be the same.

Figure 5C:
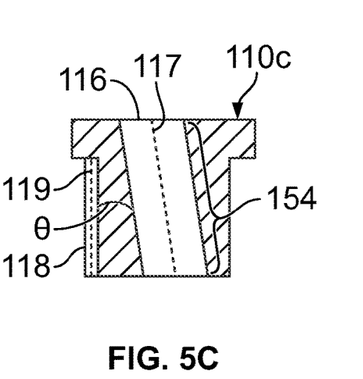
FIG. 5C illustrates an axial cross section of a guide insert through line 5-5 of FIG. 4, according to an example of the present disclosure.

FIG. 5C illustrates an axial cross section of a guide insert 110c through line 5-5 of FIG. 4, according to an example of the present disclosure. As shown, the channel 116 of the guide insert 110b is not coaxial with the plug 130 and the collar 132. The channel 116 has a third length 154, which can be different than the first length 150 shown in FIG. 5A and/or the second length 152 shown in FIG. 5B. The channel 116 has an axis 117 having a third axial angle θ in relation to the key 118. For example, the axis 117 is at the angle θ in relation to the longitudinal axis 119 of the key 118. The third axial angle θ differs from the first axial angle of FIG. 5A, and the second axial angle of FIG. 5B. Referring to FIGS. 4 and 5B, the axis 117 also has a third radial angle in relation to the key 118. The third radial angle β can differ from the first radial angle β of the guide insert 110a and/or the second radial angle β of the guide insert 110b. Optionally, the third radial angle β can be the same as one or both of the first radial angle β and/or the second radial angle β.

Referring to FIGS. 4-5C, examples of guide inserts 110a-110c are shown. The channels 116 of the guide inserts 110 have different orientations. The orientations differ with respect to one or more of length, axial angle, and/or radial angle. The orientations of the channels 116 shown in FIGS. 5A-5C are merely exemplary, and can be different than shown. In at least one example, orientations of at least two of the channels 116 of the guide inserts 110 shown in FIGS. 1 and 3 can be different, while orientations of at least two channels 116 of other guide inserts 110 can be the same.

Referring again to FIGS. 1-3, mating between the keys 118 and the index slots 114 ensures that the guide inserts 110 are securely positioned within the fixture template 108 at respective positions of the fixture template 108. The mating between the keys 118 and the index slots 114 also constrains the guide inserts 110 within the insert holes 112 to ensure that the orientations of the channels 116 are maintained when the operative member 106 of the tool 102 is disposed within the channels 116.

In at least one example, the fixture template 108 also includes a fixture identifier 160 proximate to (such as directly below, to a lower left, or the like of) each insert hole 112. The fixture identifier 160 can be a number, letter, text, or the like. Similarly, each guide insert 110 includes an insert identifier 162, such as on an outer surface of a plug 130. The insert identifier 162 can be a number, letter, text, or the like. The fixture identifier 160 corresponds to the insert identifier 162 of a corresponding guide insert 110 to be disposed within a particular insert hole 112. In this manner, the fixture identifiers 160 and the insert identifiers 162 cooperate to ensure that a particular guide insert 110 having a desired orientation is disposed within the appropriate insert hole 112. That is, the insert identifier 162 of a guide insert 110 is to match the fixture identifier 160 proximate to a corresponding insert hole 112 to ensure proper positioning of the guide inserts 110 within the fixture template 108. Alternatively, the fixture template 108 may not include fixture identifiers, and the guide inserts 110 may not include insert identifiers.

Figure 6:
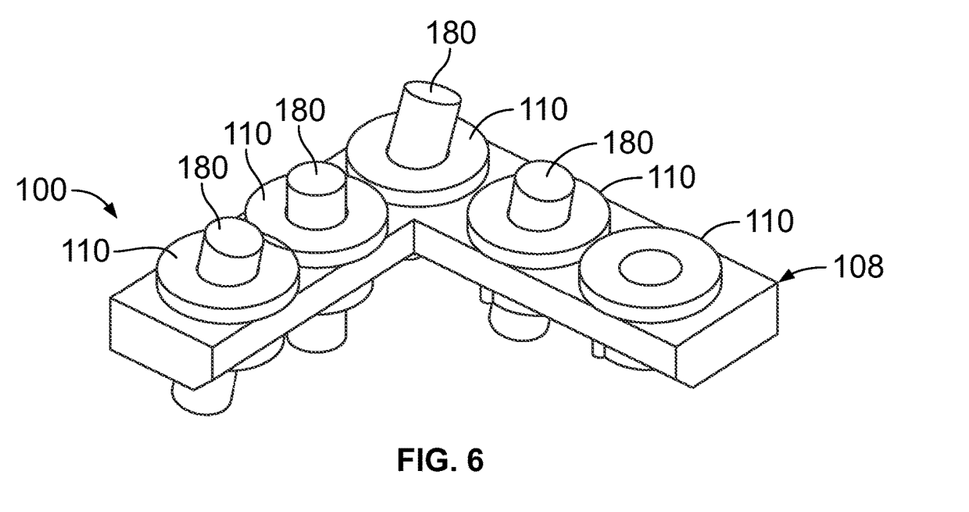
FIG. 6 illustrates an isometric top view of the system, according to an example of the present disclosure.

FIG. 6 illustrates an isometric top view of the system 100, according to an example of the present disclosure. Referring to FIGS. 1-6, as shown, the fixture template 108 secures each of the guide inserts 110 at a different position. That is, each guide insert 110 is secured within a respective insert hole 112 of the fixture template 108. The channels 116 of the guide inserts 110 are oriented differently, thereby providing different operative paths 180 (both in terms of a different position, and a different orientation) for the operative member 106 of the tool 102.

In at least one example, the locations of the insert holes 112, the orientation of the index slots 114, and the orientations of the channels 116 are predetermined, and are used to fabricate the fixture template 108 and the guide inserts 110, in order to replicate hole locations for the pattern of openings 103.

As described herein, certain examples of the present disclosure provide the system 100, which can be an adaptable drill fixture device. The system 100 includes modular and removable guide inserts 110, such as drill guide bushings, having indexing features (such as the keys 118) for positive location within the insert holes 112 of the fixture template 108. Replication of existing hole patterns (such as a desired pattern of openings 103) can be achieved by incorporating each unique hole location and orientation from the channels 116 of the guide inserts 110. Three dimensional measurement data of holes is utilized to fabricate the guide inserts 110 for each hole of the pattern of openings 103.

Figure 7:
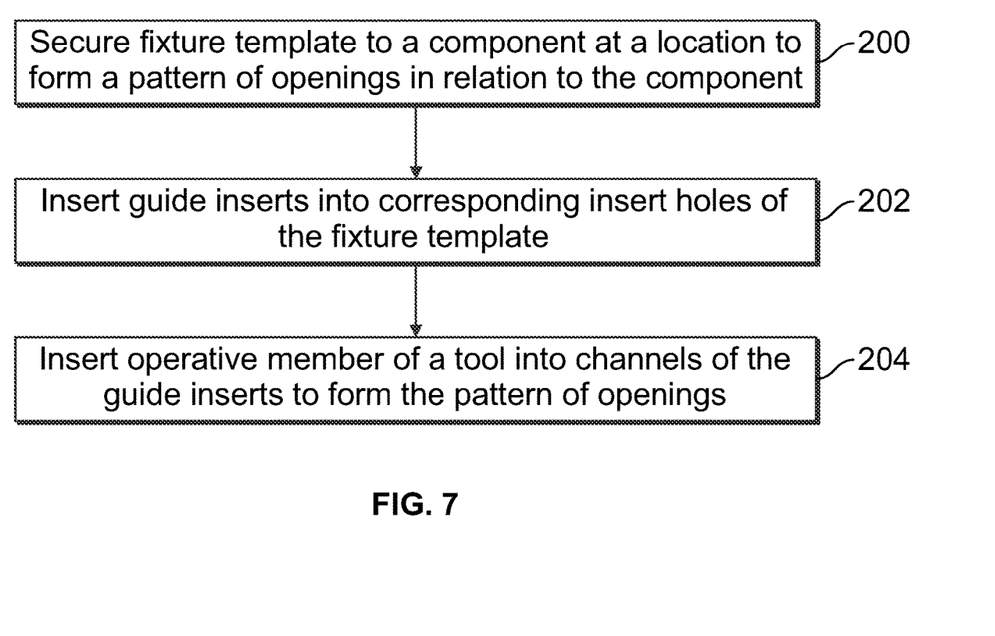
FIG. 7 illustrates a flow chart of a method for aligning a tool in relation to a component, according to an example of the present disclosure.

FIG. 7 illustrates a flow chart of a method for aligning a tool in relation to a component, according to an example of the present disclosure. Referring to FIGS. 1 and 7, the method begins at 200, at which the fixture template 108 is secured to the component 104 at a location to form a desired pattern of openings 103 in relation to the component 104. At 202, the guide inserts 110 are inserted into corresponding insert holes 112 of the fixture template 108. At 204, the operative member 106 of the tool 102 is inserted into the channels 116 of the guide inserts 110 (and the tool 102 operated accordingly) to form the pattern of the openings 103.

Figure 8:
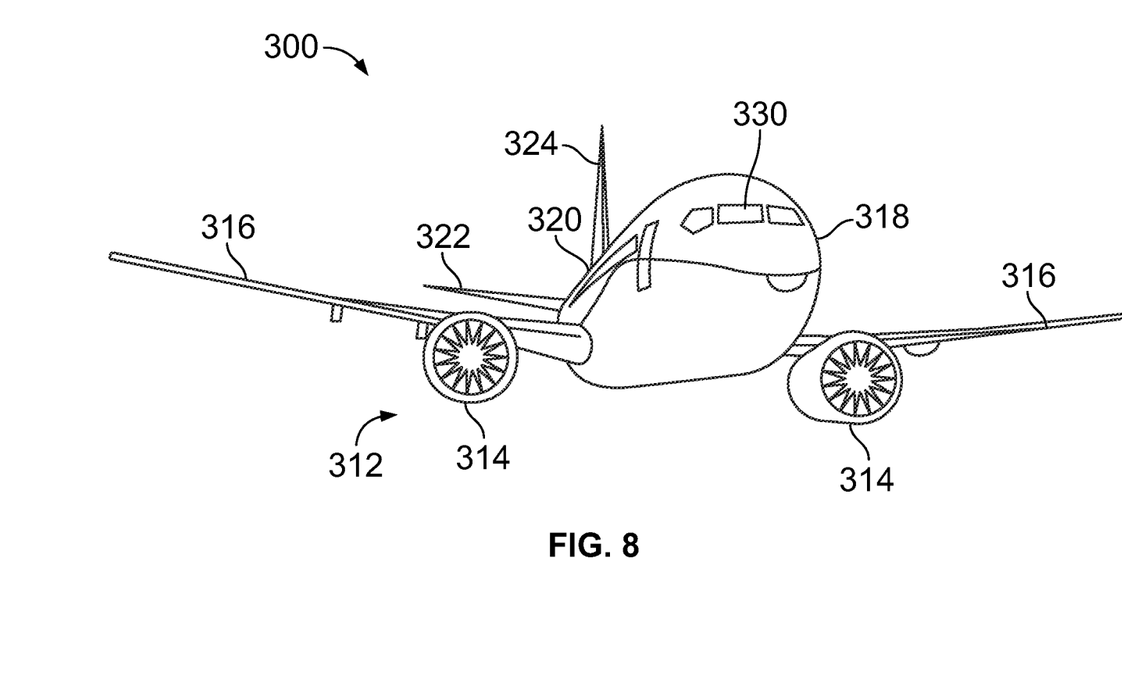
FIG. 8 illustrates a perspective front view of an aircraft, according to an example of the present disclosure.

FIG. 8 illustrates a perspective front view of an aircraft 300, according to an example of the present disclosure. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like.

Examples of the present disclosure can be used to form a pattern of openings on various components of the aircraft 300, for example. For example, the systems and methods described herein can be used to form patterns of openings in various replacement components, such as replacement skin panels, of the aircraft 300. FIG. 8 shows an example of an aircraft 300. It is to be understood that the aircraft 300 can be sized, shaped, and configured differently than shown in FIG. 8.

Further, the disclosure comprises examples according to the following clauses:

Clause 1. A system comprising:
    a fixture template configured to be secured to a component, the fixture template including a plurality of insert holes; and
    a plurality of guide inserts having channels, wherein each of the channels has an orientation,
    wherein the orientation of at least two of the plurality of guide inserts differs,
    wherein each of the plurality of guide inserts is removably secured within a respective one of the plurality of inserts holes to position and orient the channels in relation to a pattern of openings to be formed in relation to the component, and wherein each of the channels is configured to receive an operative member of a tool that is configured to form the pattern of openings in relation to the component.

Clause 2. The system of Clause 1, wherein the tool is a drill.

Clause 3. The system of Clauses 1 or 2, wherein the component is a portion of an aircraft.

Clause 4. The system of any of Clauses 1-3, wherein the fixture template further comprises index slots connected to the plurality of insert holes, and wherein the plurality of guide inserts comprise keys that are configured to be removably secured within the index slots.

Clause 5. The system of any of Clauses 1-4, wherein the orientation of each of and all of the plurality of guide inserts differs.

Clause 6. The system of any of Clauses 1-5, wherein each of the plurality of guide inserts comprises a plug and a collar, wherein the channels are formed through the plug and collar, and wherein the plug is configured to be received and retained by one of the plurality of insert holes.

Clause 7. The system of any of Clauses 1-6, wherein outer dimensions of the plug and the collar for each of the plurality of guide inserts are common.

Clause 8. The system of any of Clauses 1-7, wherein the orientation comprises a length, an axial angle, and a radial angle, wherein the orientation of at least two of the plurality of guide inserts differs with respect to one or more of the length, the axial angle, or the radial angle.

Clause 9. The system of any of Clauses 1-8, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

Clause 10. A method comprising:
securing a fixture template to a component, the fixture template including a plurality of insert holes;
removably securing each of a plurality of guide inserts within a respective one of the plurality of inserts holes to position and orient channels of the plurality of guide inserts in relation to a pattern of openings to be formed in relation to the component, wherein each of the channels has an orientation, wherein the orientation of at least two of the plurality of guide inserts differs; and
receiving, by each of the channels, an operative member of a tool that is configured to form the pattern of openings in relation to the component.

Clause 11. The method of Clause 10, wherein the tool is a drill.

Clause 12. The method of Clauses 10 or 11, wherein the component is a portion of an aircraft.

Clause 13. The method of any of Clauses 10-12, further comprising removably securing keys of the plurality of guide inserts within index slots connected to the plurality of insert holes.

Clause 14. The method of any of Clauses 10-13, wherein the orientation of each of and all of the plurality of guide inserts differs.

Clause 15. The method of any of Clauses 10-14, wherein each of the plurality of guide inserts comprises a plug and a collar, wherein the channels are formed through the plug and collar, and wherein the plug is configured to be received and retained by one of the plurality of insert holes.

Clause 16. The method of Clause 15, wherein outer dimensions of the plug and the collar for each of the plurality of guide inserts are common.

Clause 17. The method of any of Clauses 10-16, wherein the orientation comprises a length, an axial angle, and a radial angle, wherein the orientation of at least two of the plurality of guide inserts differs with respect to one or more of the length, the axial angle, or the radial angle.

Clause 18. The method of any of Clauses 10-17, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

Clause 19. A system comprising:
a fixture template configured to be secured to a component, the fixture template including a plurality of insert holes and index slots connected to the plurality of insert holes; and
a plurality of guide inserts having channels and a key that is configured to be removably secured within tone of the index slots, wherein each of the channels comprises an orientation and,
wherein the orientation of at least two of the plurality of guide inserts differs, wherein the orientation comprises a length, an axial angle, and a radial angle, wherein the orientation of at least two of the plurality of guide inserts differs with respect to one or more of the length, the axial angle, or the radial angle,
wherein each of the plurality of guide inserts is removably secured within a respective one of the plurality of inserts holes to position and orient the channels in relation to a pattern of openings to be formed in relation to the component, and
wherein each of the channels is configured to receive an operative member of a drill that is configured to form the pattern of openings in relation to the component.

Clause 20. The system of Clause 19, wherein each of the plurality of guide inserts comprises a plug and a collar, wherein the channels are formed through the plug and collar, wherein the plug is configured to be received and retained by one of the plurality of insert holes, and wherein outer dimensions of the plug and the collar for each of the plurality of guide inserts are common, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

As described herein, examples of the present disclosure provide a system and a method for efficiently and effectively forming a pattern of holes in a component. Further, examples of the present disclosure provide a system and a method for efficiently and effectively replacing portions of a component, such as skin portions of a fuselage of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a fixture template configured to be secured to a component, the fixture template including a plurality of insert holes; and
   a plurality of guide inserts, wherein each of the plurality of guide inserts comprises:
      a respective plug;
      a respective collar; and
      a respective channel formed through the plug and the collar corresponding thereto, and wherein the respective plug of each of the plurality of guide inserts is configured to be received and retained by one of the plurality of insert holes of the fixture template,
      wherein the respective channel formed through the plug and the collar corresponding thereto has a longitudinal axis, and the respective channel extends a length that spans an entirety of said plug and an entirety of said collar,
      wherein, when each of the plurality of guide inserts is received and is retained by one of the plurality of insert holes of the fixture template, the respective longitudinal axis for each respective channel has an oblique orientation with respect to a vertical extending longitudinal axis of a corresponding key of each of the plurality of guide inserts,
      wherein outer dimensions of the respective plug and the respective collar for each of the plurality of guide inserts are the same, and wherein the oblique orientation of the respective channel of at least two of the plurality of guide inserts differs,
   wherein each of the plurality of guide inserts is removably secured within a respective one of the plurality of inserts holes to position and orient the respective channel of each of the plurality of guide inserts in relation to a pattern of openings to be formed in the component, and
   wherein the respective channel of each of the plurality of guide inserts is configured to receive an operative member of a tool that is configured to form the pattern of openings in the component.

2. The system of claim 1, wherein the tool is a drill.

3. The system of claim 1, wherein the component is a portion of an aircraft.

4. The system of claim 1,
   wherein the fixture template further comprises a plurality of index slots,
   wherein each one of the plurality of index slots is connected to a corresponding one of the plurality of insert holes, and
   wherein each of the plurality of guide inserts comprises a respective key that is configured to be removably secured within a corresponding one of the plurality of index slots.

5. The system of claim 1, wherein the oblique orientation of each of and all of the plurality of guide inserts differs.

6. The system of claim 1, wherein, for at least two of the plurality of guide inserts, a respective length, a respective axial angle, and a respective radial angle of the corresponding channel differs for each of the at least two of the plurality of guide inserts.

7. The system of claim 1, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

8. The system of claim 1, wherein the plurality of insert holes includes four or more insert holes, and the plurality of guide inserts includes four or more guide inserts.

9. The system of claim 1, wherein the fixture template comprises a main body having a first surface and a second surface opposite from the first surface, wherein each of the plurality of insert holes is formed through the main body between and through the first surface and the second surface.

10. A system comprising:
    a fixture template configured to be secured to a component, the fixture template including a plurality of insert holes and a plurality of index slots, wherein each one of the plurality of index slots is connected to a corresponding one of the plurality of insert holes; and
    a plurality of guide inserts, wherein each of the plurality of guide inserts comprises:
       a respective plug;

a respective collar;

a respective key that is configured to be removably secured within a corresponding one of the plurality of index slots, and a respective channel formed through the plug and the collar corresponding thereto, and wherein the respective plug of each of the plurality of guide inserts is configured to be received and retained by one of the plurality of insert holes of the fixture template, wherein the respective channel formed through the plug and the collar corresponding thereto has a longitudinal axis, and the respective channel extends a length that spans an entirety of said plug and an entirety of said collar, and wherein, when each of the plurality of guide inserts is received and is retained by one of the plurality of insert holes of the fixture template, the respective longitudinal axis for each respective channel has an oblique orientation with respect to a vertical extending longitudinal axis of the corresponding key of each of the plurality of guide inserts, wherein the oblique orientation of the respective channel of at least two of the plurality of guide inserts differs, and wherein outer dimensions of the respective plug and the respective collar for each of the plurality of guide inserts are the same, wherein each of the plurality of guide inserts is removably secured within a respective one of the plurality of inserts holes to position and orient the respective channel of each of the plurality of guide inserts in relation to a pattern of openings to be formed in the component, and wherein the respective channel of each of the plurality of guide inserts is configured to receive an operative member of a drill that is configured to form the pattern of openings in the component.

11. The system of claim 10, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

12. A method of operating the system according to claim 1, the method comprising:

providing the system of claim 1;

securing the fixture template to a component;

removably securing each of the plurality of guide inserts within a respective one of the plurality of insert holes of the fixture template so as to position and orient the respective channel of each of the plurality of guide inserts in relation to the pattern of openings that is to be formed in the component; and inserting, in the respective channel of each of the plurality of guide inserts, the operative member of the tool which is configured to form the pattern of openings in the component.

13. The method of claim 12, wherein the tool is a drill.

14. The method of claim 12, wherein the component is a portion of an aircraft.

15. The method of claim 12, further comprising removably securing a respective key of each of the plurality of guide inserts within a corresponding one of a plurality of index slots, wherein each of the plurality of index slots is connected to a corresponding one of the plurality of insert holes.

16. The method of claim 12, wherein the oblique orientation of each of and all of the plurality of guide inserts differs.

17. The method of claim 12, wherein, for at least two of the plurality of guide inserts, a respective length, a respective axial angle, and a respective radial angle of the corresponding channel differs for each of the at least two of the plurality of guide inserts.

18. The method of claim 12, wherein the fixture template further comprises a different fixture identifier proximate to each of the plurality of insert holes, wherein each of the plurality of guide inserts comprises a different insert identifier, and wherein each of the different insert identifiers corresponds to one of the different fixture identifiers to ensure proper location of the plurality of guide inserts within the plurality of insert holes.

19. The method of claim 12, wherein the plurality of insert holes includes four or more insert holes, and the plurality of guide inserts includes four or more guide inserts.

20. The method of claim 12, wherein the fixture template comprises a main body having a first surface and a second surface opposite from the first surface, wherein each of the plurality of insert holes is formed through the main body between and through the first surface and the second surface.

* * * * *